US012341285B2

(12) United States Patent
Yamoto

(10) Patent No.: US 12,341,285 B2
(45) Date of Patent: Jun. 24, 2025

(54) CONNECTOR WITH STRENGTH REDUCTION SUPPRESSIBLE LANCE

(71) Applicant: SUMITOMO WIRING SYSTEMS, LTD., Mie (JP)

(72) Inventor: Yusuke Yamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 354 days.

(21) Appl. No.: 17/981,709

(22) Filed: Nov. 7, 2022

(65) Prior Publication Data

US 2023/0170642 A1 Jun. 1, 2023

(30) Foreign Application Priority Data

Nov. 26, 2021 (JP) ................................ 2021-191678

(51) Int. Cl.
*H01R 13/422* (2006.01)
*H01R 13/639* (2006.01)

(52) U.S. Cl.
CPC ....... *H01R 13/4223* (2013.01); *H01R 13/639* (2013.01)

(58) Field of Classification Search
CPC .................................................. H01R 13/4223
USPC ......................................... 439/595, 744, 740
See application file for complete search history.

(56) References Cited

U.S. PATENT DOCUMENTS

| | | | | |
|---|---|---|---|---|
| 4,565,416 A * | 1/1986 | Rudy | H01R 13/4364 | 439/600 |
| 4,900,271 A * | 2/1990 | Colleran | H01R 13/113 | 439/856 |
| 4,902,247 A * | 2/1990 | Suzuki | H01R 13/5221 | 439/598 |
| 4,944,696 A * | 7/1990 | Sueyoshi | H01R 13/4364 | 439/598 |
| 5,088,938 A * | 2/1992 | Murakami | H01R 13/4365 | 439/595 |
| 6,126,484 A * | 10/2000 | Klein | H01R 13/4223 | 439/852 |
| 6,948,986 B2 * | 9/2005 | Kojima | H01R 13/4223 | 439/752 |
| 7,004,790 B2 * | 2/2006 | Martin | H01R 13/4223 | 439/595 |
| 7,074,066 B2 * | 7/2006 | Pepe | H01R 13/5219 | 439/321 |
| 7,661,987 B2 * | 2/2010 | Adachi | H01R 13/652 | 439/924.1 |
| 7,867,028 B2 * | 1/2011 | Brown | H01R 13/641 | 439/595 |

(Continued)

FOREIGN PATENT DOCUMENTS

JP 2012-216344 A 11/2012

*Primary Examiner* — Marcus E Harcum
(74) *Attorney, Agent, or Firm* — Venjuris, P.C.

(57) ABSTRACT

A connector 10 is provided with a terminal fitting 20 and a housing 50. The housing 50 has an extended surface 57. The extended surface 57 is formed outside a cavity 51 in a width direction and facing one side in a height direction. A locking lance 52 includes a restricting portion 60 and a protruding portion 61. The protruding portion 61 protrudes in the width direction from the restricting portion 60 toward a side where the extended surface 57 is located. The protruding portion 61 has a facing surface (e.g. first facing surface 64) facing the extended surface 57 from the one side in the height direction.

5 Claims, 13 Drawing Sheets

(56) References Cited

U.S. PATENT DOCUMENTS 7,867,029 B2 * 1/2011 Takahashi .......... H01R 13/4223 439/595
8,021,199 B2 * 9/2011 Ambo .................. H01R 13/502 439/752
8,226,436 B2 * 7/2012 Suzuki ................. H01R 13/113 439/595
8,342,880 B2 * 1/2013 Kato .................. H01R 13/4226 439/382
8,747,156 B2 * 6/2014 Hirabayashi ....... H01R 13/4223 439/595
8,747,157 B2 * 6/2014 Tashiro ................ H01R 13/506 439/246
8,845,362 B2 * 9/2014 Chikusa ............. H01R 13/6275 439/595
8,864,533 B2 * 10/2014 Morikawa ................ H01R 4/62 439/730
9,509,077 B2 * 11/2016 Lihoshi .............. H01R 13/4223
9,716,341 B2 * 7/2017 Yamane ........... H01R 13/62938
2004/0192109 A1 * 9/2004 Fukatsu ............. H01R 13/4223 439/595
2008/0009186 A1 * 1/2008 Hiramatsu ......... H01R 13/4362 439/595
2015/0222039 A1 * 8/2015 Akiguchi ............... H01R 13/41 439/746
2016/0072212 A1 * 3/2016 Shindo ............... H01R 13/4362 439/744
2016/0190724 A1 * 6/2016 Mito .................. H01R 13/4223 439/746
2019/0267725 A1 * 8/2019 Zhang .................. H01R 13/432
2022/0069505 A1 * 3/2022 Yonezu .............. H01R 13/4223
2023/0261422 A1 * 8/2023 Maesoba .......... H01R 13/65915 439/607.01
2023/0318218 A1 * 10/2023 Enomoto ............. H01R 13/639 439/660
2023/0361498 A1 * 11/2023 Saito ...................... H01R 24/40

* cited by examiner

CONNECTOR WITH STRENGTH REDUCTION SUPPRESSIBLE LANCE

CROSS-REFERENCE TO RELATED APPLICATIONS

This application is based on and claims priority from Japanese Patent Application No. 2021-191678, filed on Nov. 26, 2021, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2012-216344 is provided with a housing and a locking lance. The housing includes a cavity, into which a terminal fitting is insertable from behind. The locking lance is cantilevered forward. The locking lance is contacted by the terminal fitting to be deflected and deformed in the process of inserting the terminal fitting into the cavity, and retains and holds the terminal fitting by being displaced in a return direction with the terminal fitting properly inserted in the cavity.

In this configuration, if a rearward pulling force is applied to the terminal fitting, there is a concern that the locking lance is buckled to reduce a force for restricting a rearward movement of the terminal fitting when the locking lance is deflected and deformed in an opposite direction opposite to a direction, in which the locking lance is deflected and deformed, in the insertion process of the terminal fitting. Accordingly, the following configuration is adopted in Japanese Patent Laid-open Publication No. 2012-216344. That is, restricting portions projecting from both side surfaces of an inner wall are formed on the inner wall of the cavity and contact portions are formed to protrude on both side edges of the locking lance. If the locking lance is going to be deflected and deformed in the opposite direction, the contact portions of the locking lance come into contact with the restricting portions, thereby restricting any further deflection of the locking lance. Therefore, according to the above configuration, the locking lance is hardly buckled and a reduction in force for restricting a rearward movement of the terminal fitting can be suppressed.

SUMMARY

However, since the deflection of the locking lance is restricted by the pair of restricting portions projecting from the both side surfaces of the inner wall of the cavity in the technique of Japanese Patent Laid-open Publication No. 2012-216344, a width of the locking lance is partially reduced. As a result, the strength (locking force) of the locking lance is reduced.

Accordingly, the present disclosure provides a technique capable of suppressing a reduction in the strength of a locking lance.

The present disclosure is directed to a connector with a terminal fitting and a housing, the housing including a cavity extending in a front-rear direction, a locking lance formed on one side in a height direction of the cavity, the locking lance being flexurally deformable in the height direction, and an extended surface formed outside the cavity in a width direction, the extended surface facing the one side in the height direction, the terminal fitting including a terminal body to be arranged in the cavity, the terminal body including a locking portion on the one side in the height direction, the locking lance including a restricting portion projecting into the cavity from the one side in the height direction, the restricting portion being lockable to the locking portion from behind, and a protruding portion protruding in the width direction from the restricting portion to a side where the extended surface is located, and the protruding portion having a facing surface facing the extended surface from the one side in the height direction.

According to the present disclosure, it is possible to suppress a reduction in the strength of a locking lance.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
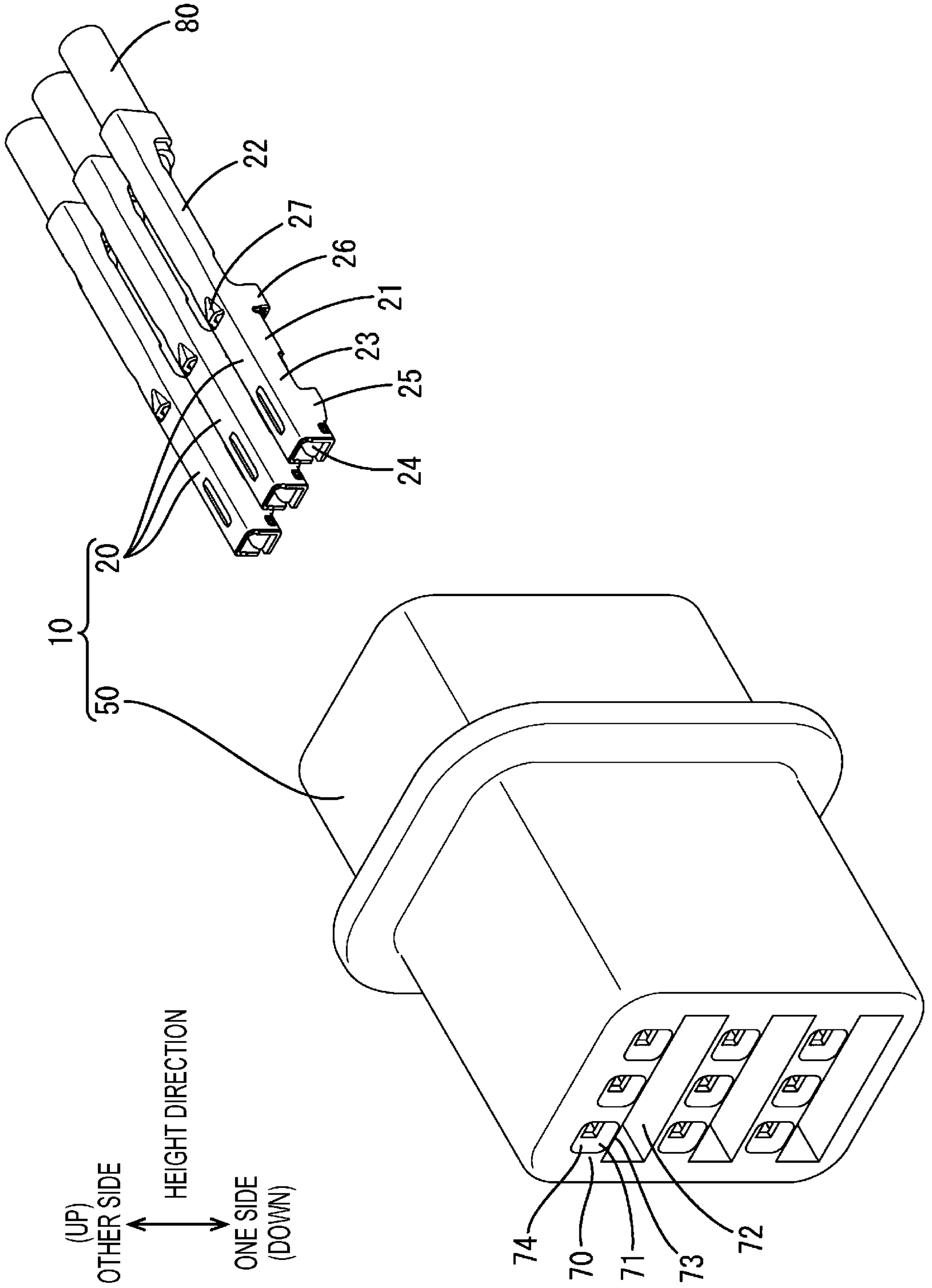
FIG. 1 is a perspective view of a connector of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

First, embodiments of the present disclosure are listed and described.

(1) The connector of the present disclosure is provided with a terminal fitting and a housing, the housing including a cavity extending in a front-rear direction, a locking lance formed on one side in a height direction of the cavity, the locking lance being flexurally deformable in the height direction, and an extended surface formed outside the cavity in a width direction, the extended surface facing the one side in the height direction, the terminal fitting including a terminal body to be arranged in the cavity, the terminal body including a locking portion on the one side in the height direction, the locking lance including a restricting portion projecting into the cavity from the one side in the height direction, the restricting portion being lockable to the locking portion from behind, and a protruding portion protruding in the width direction from the restricting portion to a side where the extended surface is located, and the protruding portion having a facing surface facing the extended surface from the one side in the height direction.

In the above connector, if a rearward force is applied to the terminal fitting arranged in the cavity, the restricting portion locks the locking portion of the terminal fitting from behind. At this time, even if the locking lance is pushed by the locking portion and deflected and deformed toward the other side (side of the terminal fitting) in the height direction, any further flexural deformation is restricted by the contact of the facing surface of the locking lance with the extended surface. Moreover, the facing surface and the extended surface are arranged outside the cavity in the width direction. Thus, a width of the locking lance needs not be reduced, wherefore a reduction in the strength (locking force) of the locking lance can be suppressed.

(2) The housing may include a front wall arranged on a front end of the housing and a mold removal hole for the locking lance defined by an end edge on the one side in the height direction of the front wall, the locking lance may be visually confirmable from front through the mold removal hole, and the front wall may include a tab insertion hole closed on an entire circumference at a position communicating with the cavity.

In a conventional connector, a mold removal hole for a locking lance is formed to communicate with a tab insertion hole. In this configuration, since a part of the tab insertion hole in a circumferential direction is lacking, it is a general practice to separately mount a front member including a tab insertion hole closed over an entire circumference. However, a configuration provided with the separate front member leads to an increase in the number of components. In this regard, in the above connector, a force of the locking lance for restricting a rearward movement of the terminal fitting is enhanced, whereby the protrusion of the locking lance toward the cavity can be suppressed, the mold removal hole for the locking lance can be defined by the end edge on the one side in the height direction of the front wall, and the tab insertion hole is closed on the entire circumference. Therefore, the above connector needs not be separately provided with a front member and can suppress an increase in the number of components.

(3) The extended surface may be formed only on one outer side in the width direction of the cavity, and the protruding portion may protrude from the restricting portion only toward the one side in the width direction where the extended surface is located.

Since the extended surface and the protruding portion are provided only on the one side in the width direction in the above connector, the enlargement of the housing in the width direction can be suppressed as compared to the configuration in which the extended surfaces and the protruding portions are provided on both sides.

(4) The restricting portion may include a restricting surface facing forward and a recess recessed rearward from the restricting surface on the one side in the width direction, and the locking portion may be fittable into the recess on the one side in the width direction while being in contact with the restricting surface.

In the configuration in which the protruding portion is arranged only on the one side in the width direction, if the locking lance is shifted toward the other side, a contact area of the facing surface and the extended surface decreases and a force for restricting the flexural deformation of the locking lance is reduced. In this regard, in the above connector, if a rearward force is applied to the terminal fitting and the restricting surface of the locking lance contacts the locking portion, an end part of the locking portion on the one side in the width direction is fit into the recess, whereby a front end part of the terminal fitting is swung toward the one side in the width direction. If the rearward force is further applied to the terminal fitting in this state, the locking lance is pulled toward the one side in the width direction. Therefore, the above connector can suppress a shift of the locking lance toward the other side in the width direction and suppress a reduction in force for restricting the flexural deformation of the locking lance.

(5) The locking lance may have a second facing surface intersecting the facing surface and facing the one side in the width direction, and the second facing surface may be arranged to face an inner surface on the one side in the width direction of the cavity with the facing surface held in contact with the extended surface.

According to the above connector, even if the locking lance is deflected and deformed toward the one side in the width direction with the facing surface of the locking lance held in contact with the extended surface, any further flexural deformation is restricted by the contact of the second facing surface with the inner surface on the one side in the width direction of the cavity. Therefore, the position of the locking lance in the width direction can be stabilized, with the result that a rearward movement of the terminal fitting can be more stably restricted.

Details of Embodiment of Present Disclosure

A specific example of the present disclosure is described below with reference to the drawings. Note that the present disclosure is not limited to these illustrations, but is represented by claims and is intended to include all changes in the scope of claims and in the meaning and scope of equivalents.

Embodiment

A connector 10 of one embodiment is disclosed in FIG. 1. The connector 10 is connected to an unillustrated mating connector. In the following description, a connecting direction of the connector 10 to the mating connector is referred to as a forward direction of the connector 10 and an opposite direction thereof is referred to as a rearward direction of the connector 10. A vertical direction of FIGS. 3 to 10 is referred to as a vertical direction. A lateral direction when the connector 10 is viewed from front is referred to as a lateral direction. Note that, in this embodiment, a lower side corresponds to “one side in a height direction”, an upper side corresponds to the “other side in the height direction”, a right side corresponds to "one side in a width direction" and a left side corresponds to the "other side in the width direction".

<Configuration of Connector 10>

As shown in FIG. 1, the connector 10 is provided with terminal fittings 20 and a housing 50.

Figure 2:
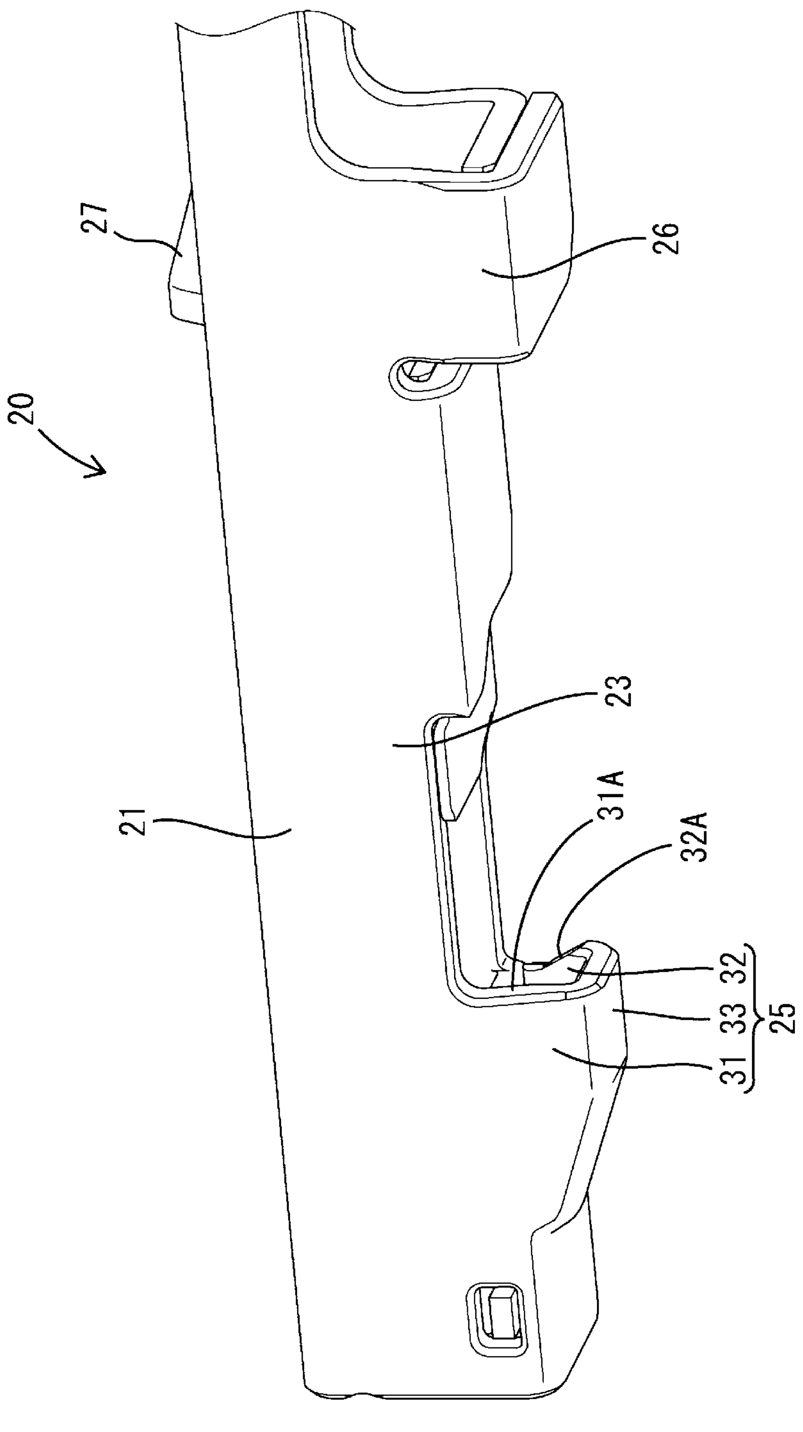
FIG. 2 is a perspective view of a front part of a terminal fitting when viewed laterally.
Figure 3:
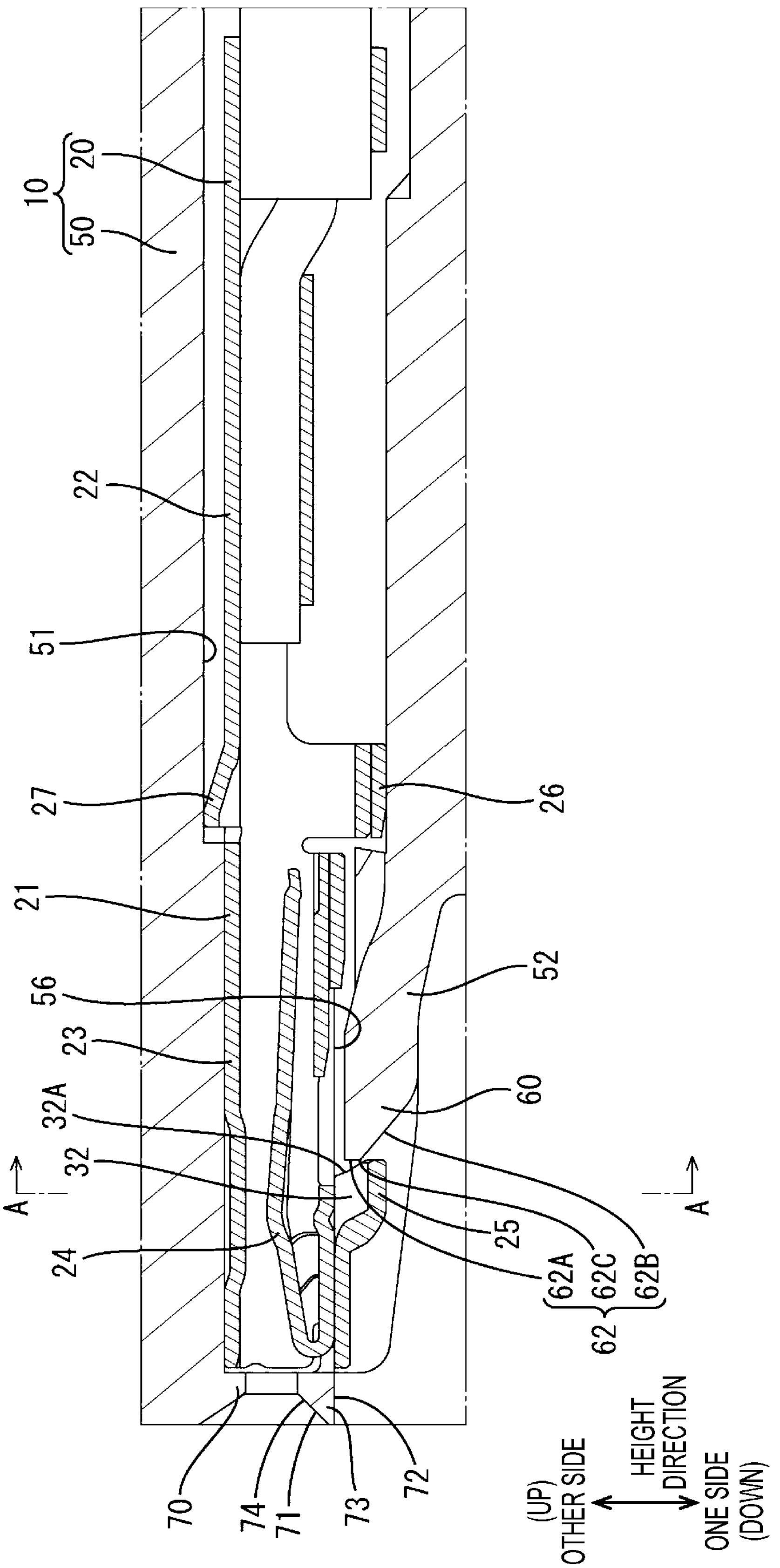
FIG. 3 is a side view in section showing a state where the terminal fitting is arranged in a cavity.
Figure 7:
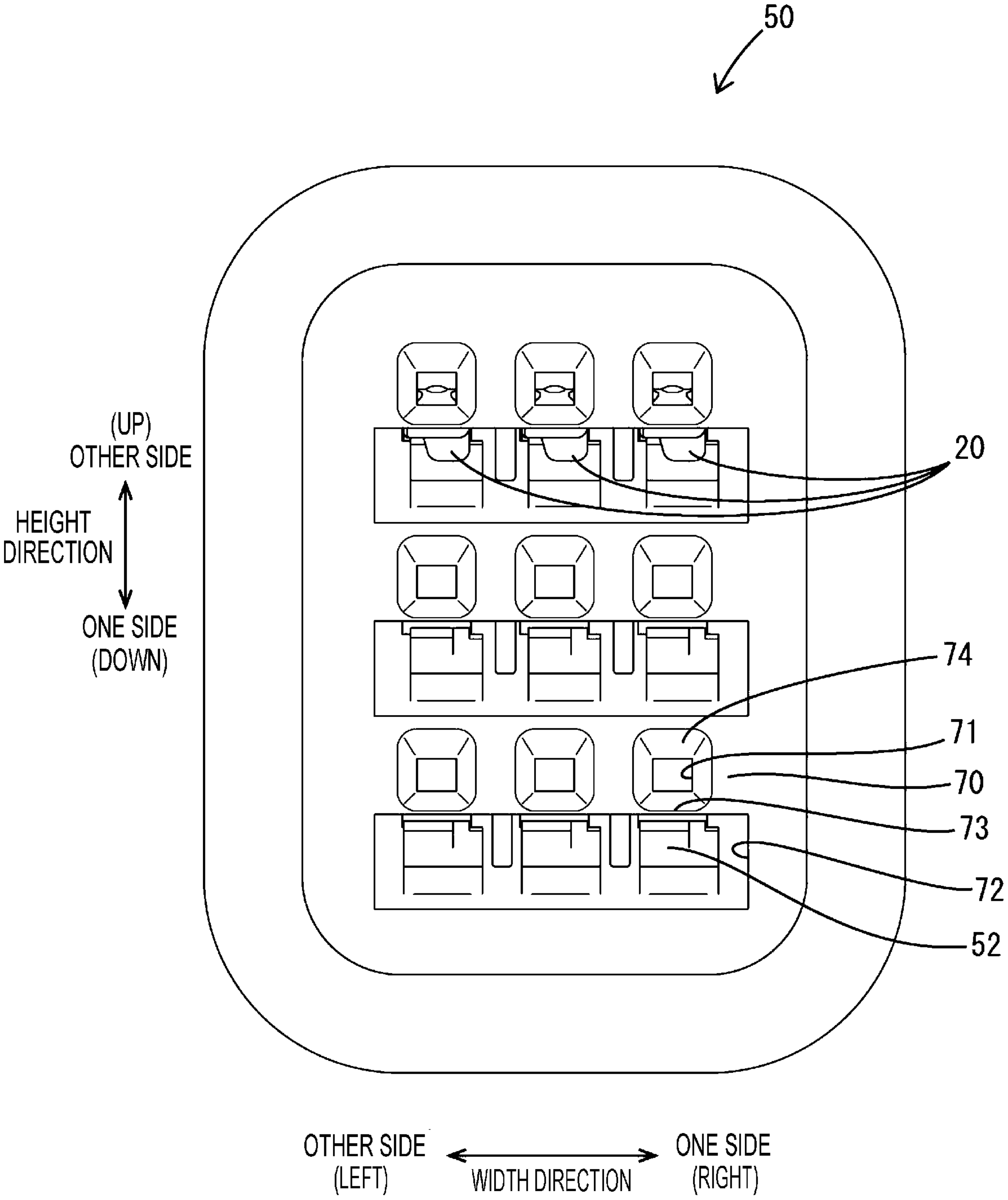
FIG. 7 is a front view of the connector.

A plurality of (nine in this embodiment) the terminal fittings 20 are provided. In FIGS. 1 and 7, six are omitted and only three are shown. The terminal fitting 20 is a female terminal fitting and electrically conductive. The terminal fitting 20 is formed by bending a metal plate. As shown in FIGS. 2 and 3, the terminal fitting 20 includes a terminal body 21 and a wire connecting portion 22.

As shown in FIGS. 2 and 3, the terminal body 21 is formed to extend in a front-rear direction. The terminal body 21 includes a tube portion 23, a resilient contact portion 24, a locking portion 25 and erroneous insertion preventing projections 26, 27.

As shown in FIGS. 2 and 3, the tube portion 23 has a tubular shape (more specifically, a rectangular tube shape) extending in the front-rear direction and is open on both front and rear sides.

As shown in FIG. 3, the resilient contact portion 24 is arranged in the tube portion 23. As shown in FIG. 1, the resilient contact portion 24 has a front end part coupled to a lower plate portion constituting the tube portion 23 and is cantilevered rearward. The resilient contact portion 24 is electrically connected to an unillustrated mating terminal fitting when the connector 10 is connected to the unillustrated mating connector.

Figure 4:
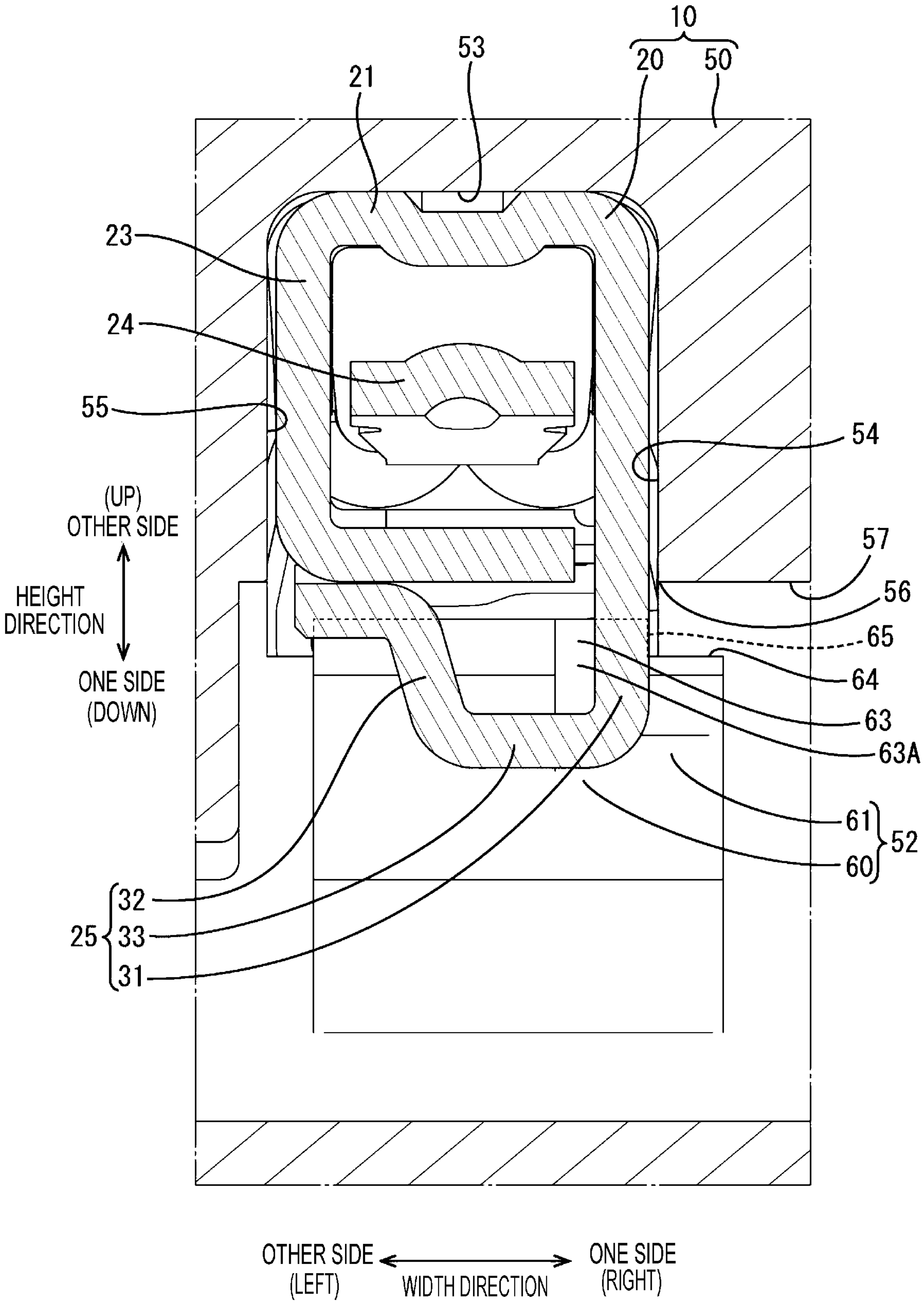
FIG. 4 is a section along A-A of FIG. 3.

As shown in FIGS. 2 to 4, the locking portion 25 is provided on a lower end side of the terminal body 21. The locking portion 25 is formed to project downward from the lower surface of the tube portion 23. The locking portion 25 includes a first projecting portion 31, a second projecting portion 32 and a coupling portion 33. The first and second projecting portions 31, 32 are respectively shaped to project downward from the lower surface of the terminal body 21. The first and second projecting portions 31, 32 are arranged apart from each other in the lateral direction. The first projecting portion 31 is arranged to the right of the second projecting portion 32. The first projecting portion 31 is provided in a right end part of the locking portion 25, and the second projecting portion 32 is provided in a left end part of the locking portion 25. The second projecting portion 32 has a second rear surface portion 32A inclined downward toward a rear side. The first projecting portion 31 has a first rear surface portion 31A inclined downward toward the rear side at an angle of inclination steeper than the second rear surface portion 32A. The second rear surface portion 32A is arranged in front of the first rear surface portion 31A. The coupling portion 33 couples lower end parts of the first and second projecting portions 31, 32.

As shown in FIG. 3, the erroneous insertion preventing projections 26, 27 are arranged behind the locking portion 25. The erroneous insertion preventing projection 26 is formed to project downward from the lower surface of the tube portion 23. The erroneous insertion preventing projection 27 is formed to project upward from the upper surface of the tube portion 23. If the terminal fitting 20 is inserted in a vertically inverted posture into a cavity 51, the erroneous insertion preventing projections 26, 27 contact steps in the cavity 51 to restrict the insertion of the terminal fitting 20.

As shown in FIG. 3, the wire connecting portion 22 is arranged behind the erroneous insertion preventing projections 26, 27. A conductor 81 of a wire 80 is electrically connected to the wire connecting portion 22 by crimping or the like.

The housing 50 is made of synthetic resin and has an insulating property. As shown in FIG. 3, the housing 50 includes cavities 51 and locking lances 52. The cavity 51 is formed to extend in the front-rear direction. The cavity 51 is open rearward of the housing 50 and the terminal fitting 20 is insertable thereinto from behind.

Figure 5:
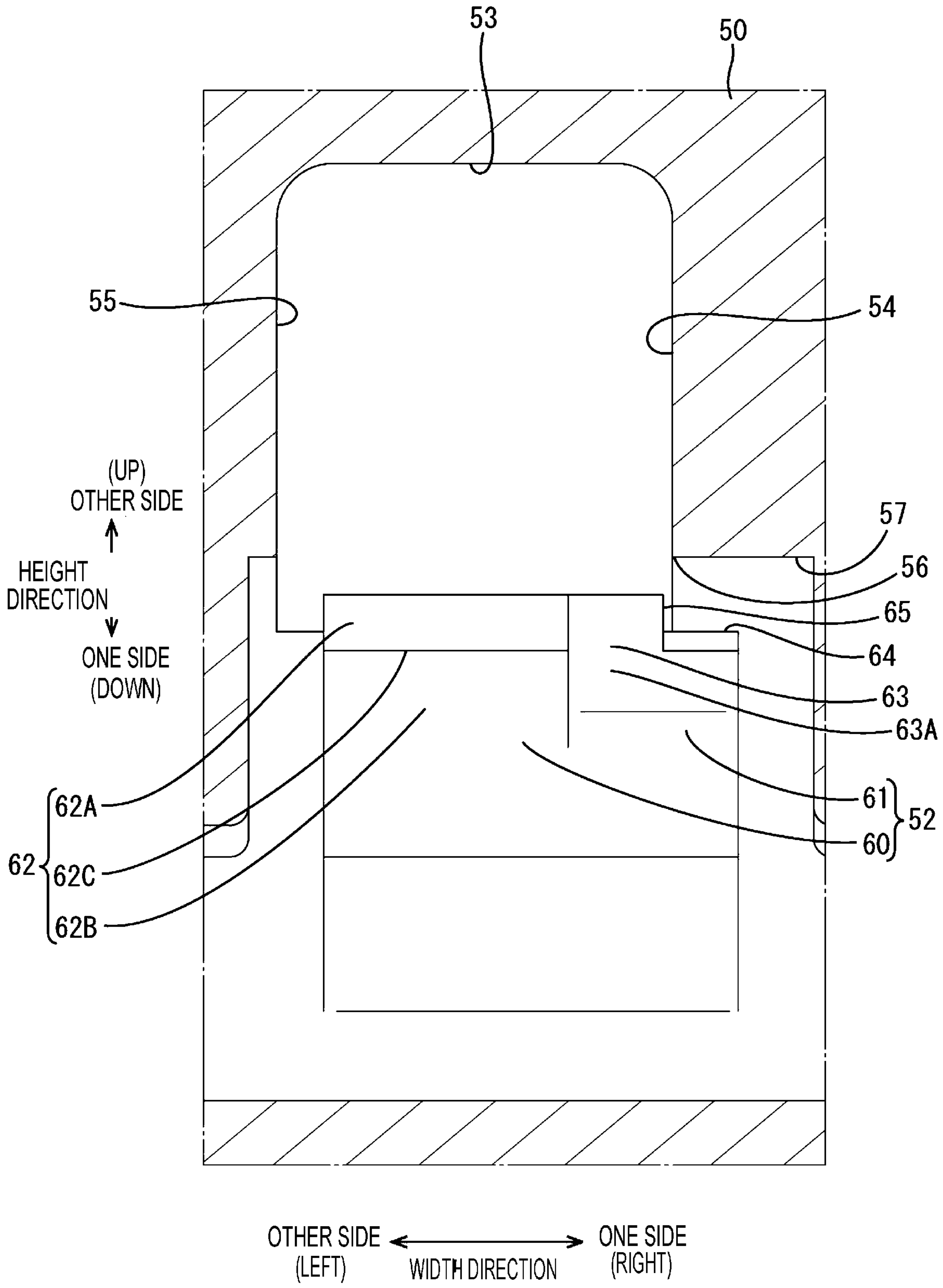
FIG. 5 is a section showing a state where the terminal fitting is removed from FIG. 4.

A plurality of the cavities 51 are provided side by side in the lateral direction and vertical direction. As shown in FIGS. 4 and 5, the inner wall surface of the cavity 51 has a lance facing surface 53, a first side surface 54 and a second side surface 55. The lance facing surface 53 is facing the locking lance 52 from above. The tube portion 23 of the terminal fitting 20 is arranged between the locking lance 52 and the lance facing surface 53.

As shown in FIG. 5, the first and second side surfaces 54, 55 are facing each other in the lateral direction. The first side surface 54 constitutes the inner wall surface on a right side of the cavity 51 and is facing leftward. The second side surface 55 constitutes the inner wall surface on a left side of the cavity 51 and is facing rightward. The terminal body 21 (more specifically, the tube portion 23) of the terminal fitting 20 is arranged between the first and second side surfaces 54, 55. Upper end parts of the first and second side surfaces 54, 55 are coupled to each other via the lance facing surface 53. Lower end parts of the first and second side surfaces 54, 55 form an opening 56 open downward. Note that the first side surface 54 corresponds to an example of "an inner surface on one side in the width direction of the cavity 51".

As shown in FIGS. 4 and 5, the housing 50 has extended surfaces 57. The extended surface 57 is formed outside the cavity 51 in the lateral direction. That is, the extended surface 57 is formed to the right of the first side surface 54. The extended surface 57 is arranged while facing downward. The extended surface 57 intersects the first side surface 54. A left end part of the extended surface 57 is connected to the lower end part of the first side surface 54.

As shown in FIG. 3, the locking lance 52 is arranged on a lower end side of the cavity 51 and flexurally deformable in the vertical direction. The locking lance 52 is cantilevered forward. The locking lance 52 projects into the cavity 51. As shown in FIG. 4, the locking lance 52 includes a restricting portion 60 and a protruding portion 61.

Figure 8:
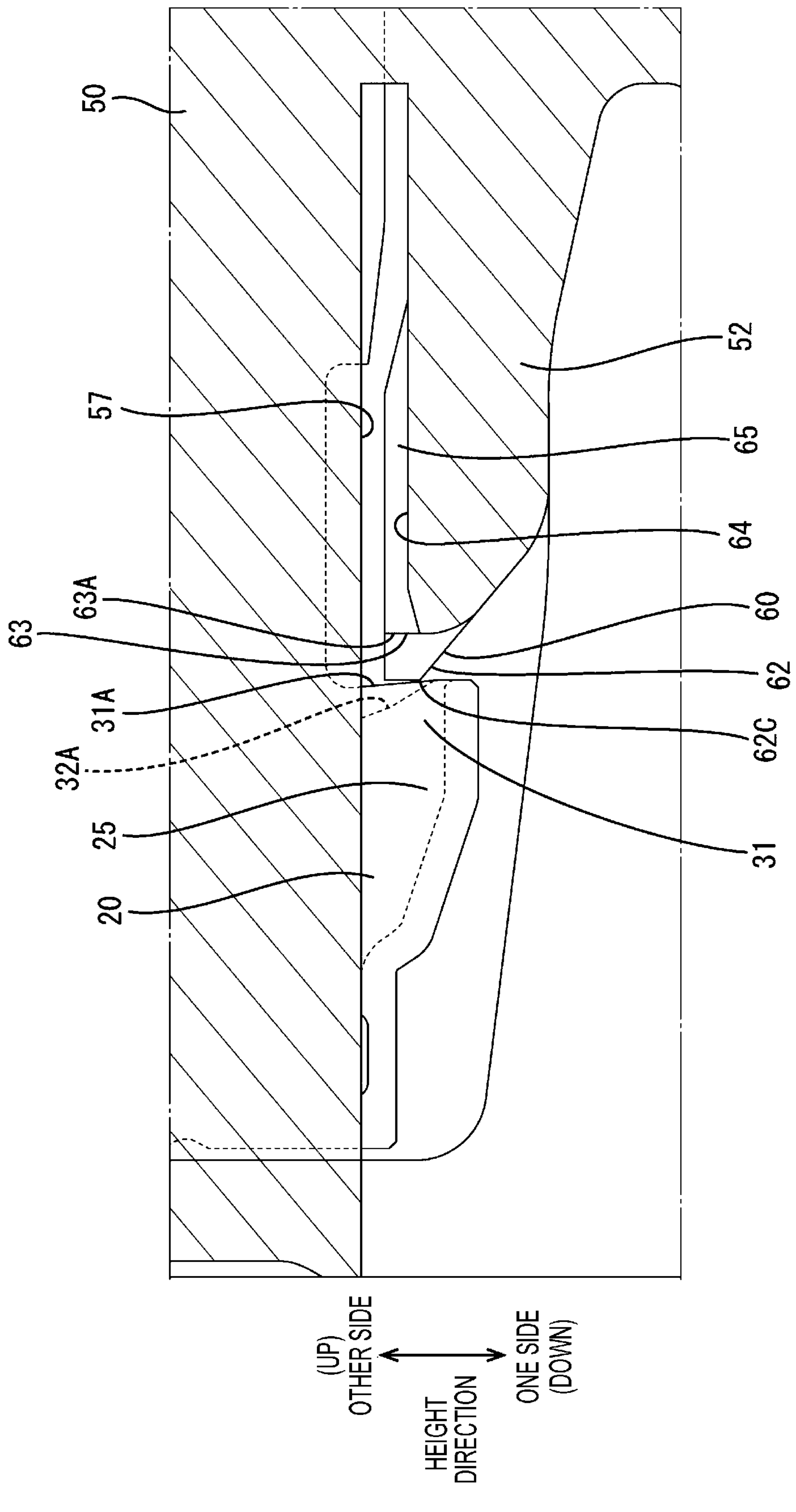
FIG. 8 is a side view in section showing a positional relationship of a locking portion of the terminal fitting arranged in the cavity and the locking lance.
Figure 11:
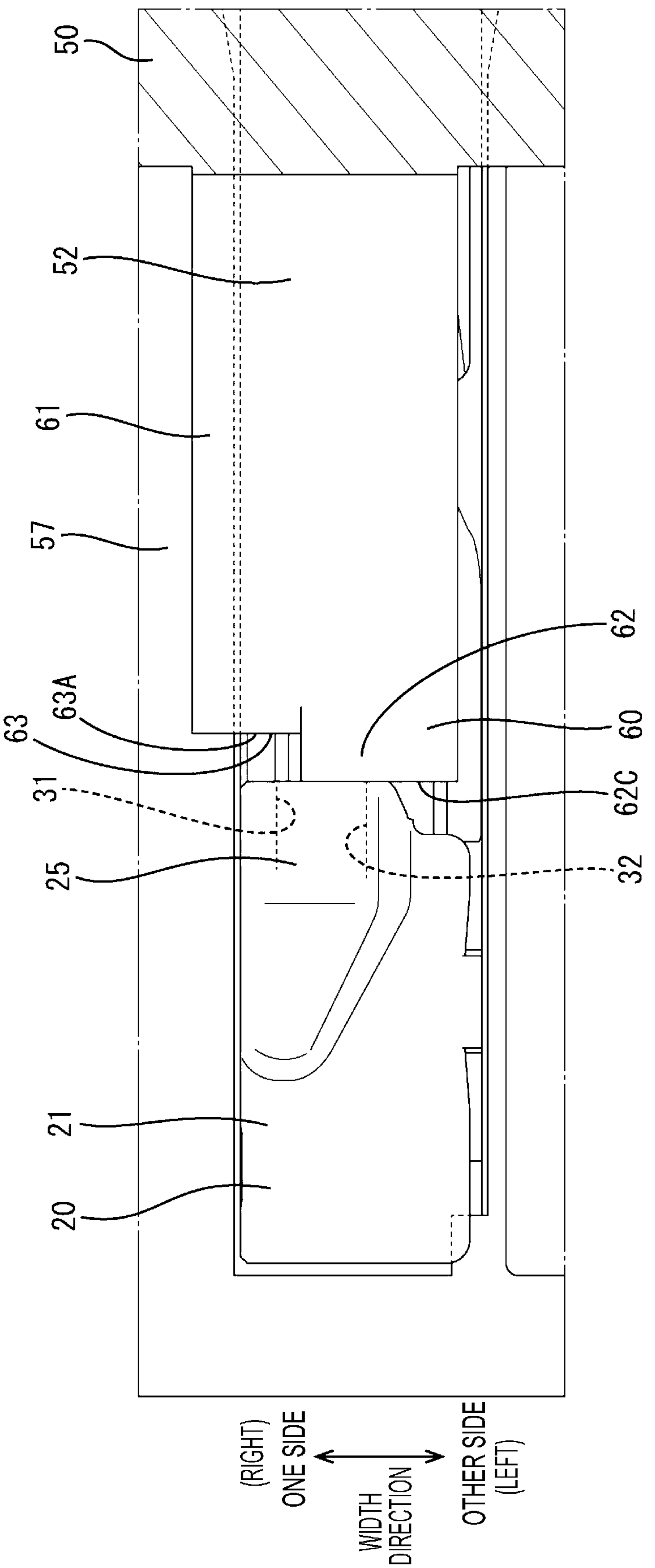
FIG. 11 is a bottom view in section showing the positional relationship of the locking portion of the terminal fitting arranged in the cavity and the locking lance.

As shown in FIG. 3, the restricting portion 60 projects into the cavity 51 from below and is lockable to the locking portion 25 from behind. As shown in FIG. 4, the restricting portion 60 is arranged between the first and second side surfaces 54, 55 in the lateral direction. As shown in FIG. 3, the restricting portion 60 is arranged behind the locking portion 25 of the terminal fitting 20 arranged in the cavity 51. The restricting portion 60 restricts a rearward movement of the terminal fitting 20 by contacting the locking portion 25 of the terminal fitting 20 moving rearward. As shown in FIGS. 8 and 11, the restricting portion 60 has a restricting surface 62 and a recess 63.

The restricting surface 62 is formed from a central part to a left end part of the restricting portion 60 in the lateral direction. The restricting surface 62 has a first surface 62A facing forward, a second surface 62B inclined downward toward the rear side from the lower end of the first surface 62A, and a corner portion 62C formed by the first and second surfaces 62A, 62B. The first surface 62A is facing the second rear surface portion 32A of the locking portion 25 from behind.

The recess 63 is recessed rearward from the restricting surface 62 in a right end part of the restricting portion 60. The recess 63 is formed to be stepped from the restricting surface 62 on a right side of the restricting surface 62. A back surface 63A of the recess 63 is facing the first rear surface portion 31A of the locking portion 25 from behind as shown in FIG. 8.

As shown in FIG. 5, the protruding portion 61 protrudes rightward from the restricting portion 60 and protrudes further rightward than the first side surface 54. The protruding portion 61 has a first facing surface 64 facing the extended surface 57 in the vertical direction. The first facing surface 64 corresponds to an example of a "facing surface". The first facing surface 64 can contact the extended surface 57 when the locking lance 52 is deflected and deformed upward. If the first facing surface 64 contacts the extended surface 57, any further upward flexural deformation of the locking lance 52 is restricted. The protruding portion 61 is provided only on the right side of the restricting portion 60. That is, a center of the locking lance 52 is offset rightward from a center of the cavity 51 in the lateral direction.

Figure 6:
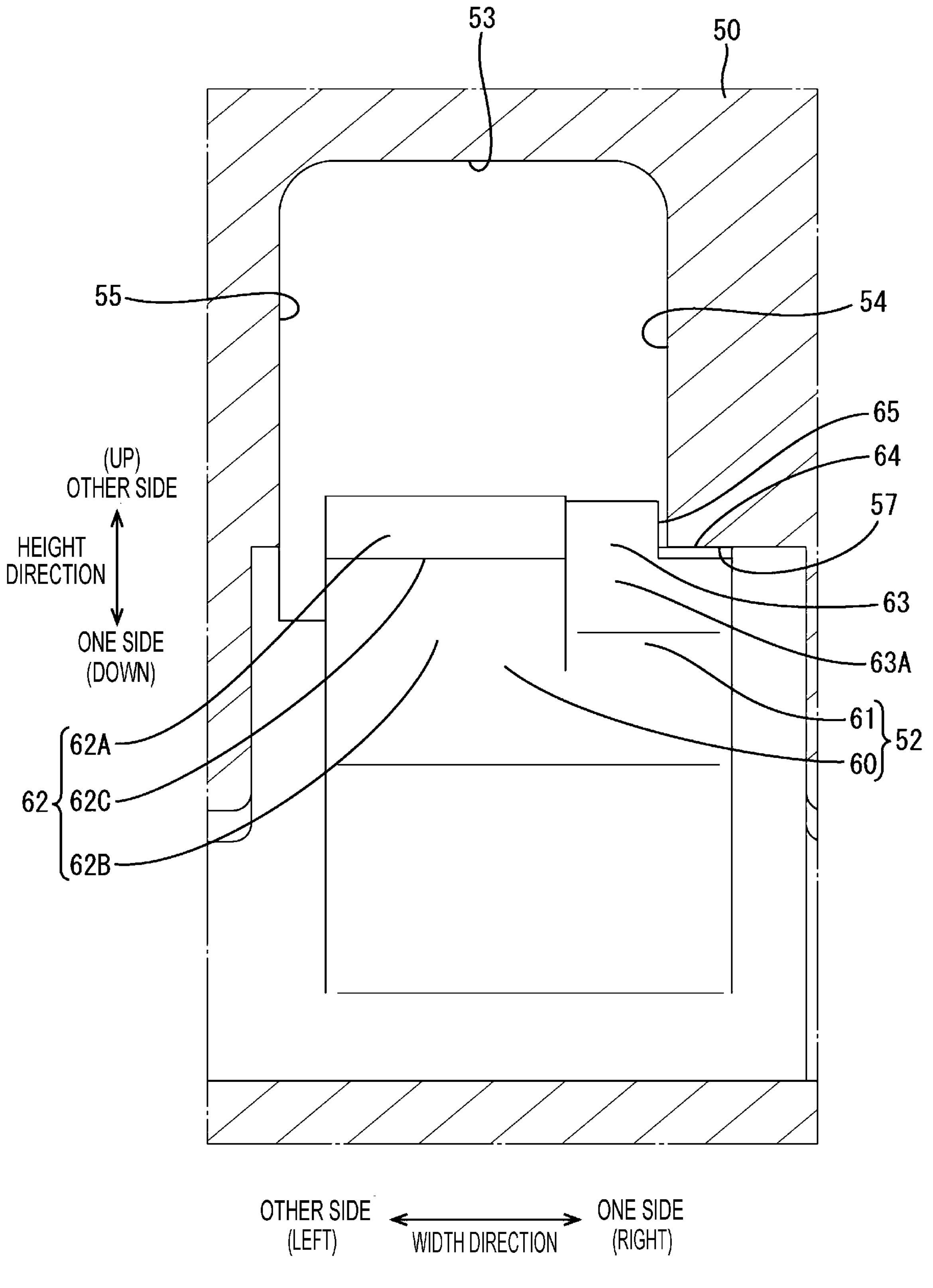
FIG. 6 is a section showing a state where a locking lance is deflected and deformed upward from the state shown in FIG. 5 to contact an extended surface.

As shown in FIG. 5, the locking lance 52 has a second facing surface 65. The second facing surface 65 is facing rightward. The second facing surface 65 intersects the first facing surface 64. A lower end part of the second facing surface 65 is connected to a left end part of the first facing surface 64. As shown in FIG. 6, the second facing surface 65 is facing the first side surface 54 in the lateral direction with the first facing surface 64 held in contact with the extended surface 57. Even if being deflected and deformed rightward, any further flexural deformation of the locking lance 52 is restricted by the contact of the second facing surface 65 with the first side surface 54.

As shown in FIGS. 3 and 7, the housing 50 includes a front wall 70, tab insertion holes 71, mold removal holes 72 for the locking lances 52 and partition walls 73. The front wall 70 is arranged on the front end of the housing 50. The front wall 70 is arranged in front of the cavities 51 and restricts forward movements of the terminal fittings 20 arranged in the cavities 51. The tab insertion hole 71 penetrates through the front wall 70 in the front-rear direction and communicates with the cavity 51. The tab insertion hole 71 is closed on an entire circumference. The tab insertion hole 71 has a tapered surface 74 expanded forward. The tapered surface 74 is formed over the entire periphery of the tab insertion hole 71. The mold removal holes 72 for the locking lances 52 are arranged below the tab insertion holes 71. The mold removal hole 72 for the locking lances 52 is defined by the lower end edge of the front wall 70. The mold removal holes 72 for the locking lances 52 are holes formed when a mold for forming the locking lances 52 is pulled out. The locking lances 52 can be visually confirmed from front through the mold removal holes 72 for the locking lances 52. The partition walls 73 are walls partitioning between the tab insertion holes 71 and the mold removal holes 72 for the locking lances 52.

<Functions and Effects of Connector 10>

The terminal fitting 20 is inserted into the cavity 51 of the housing 50 from behind. In the process of inserting the terminal fitting 20 into the cavity 51, the locking lance 52 is deflected and deformed downward by being pushed by the terminal fitting 20. If the terminal fitting 20 reaches a proper insertion position, the locking lance 52 returns to an initial shape by a resilient force of its own. In this way, as shown in FIGS. 8 and 11, the terminal fitting 20 is arranged in the cavity 51 and the restricting portion 60 of the locking lance 52 is arranged behind the locking portion 25 of the terminal fitting 20.

Figure 9:
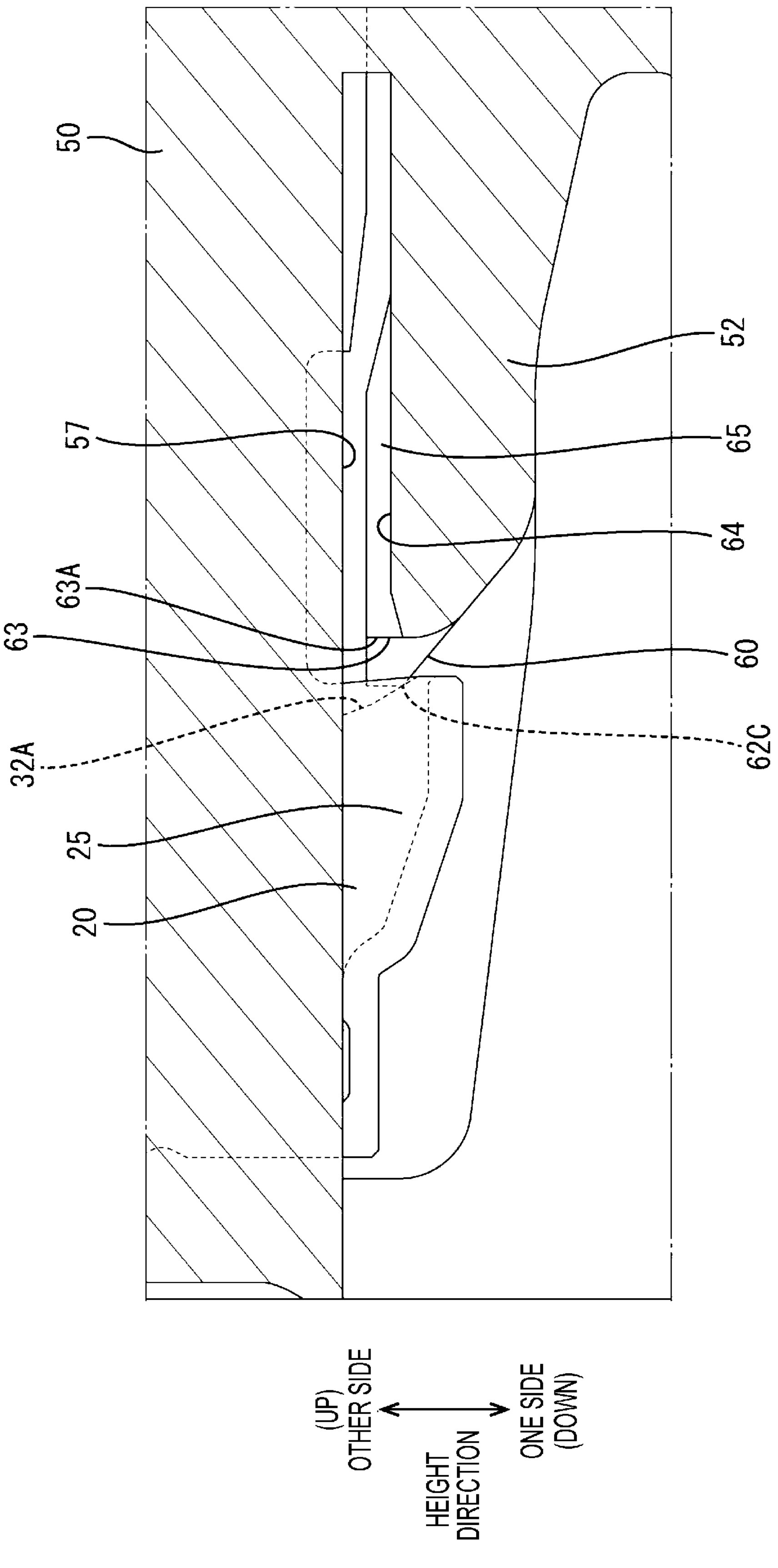
FIG. 9 is a side view in section showing a state where the terminal fitting is moved rearward from a state shown in FIG. 8 and the locking portion is in contact with the locking lance.
Figure 12:
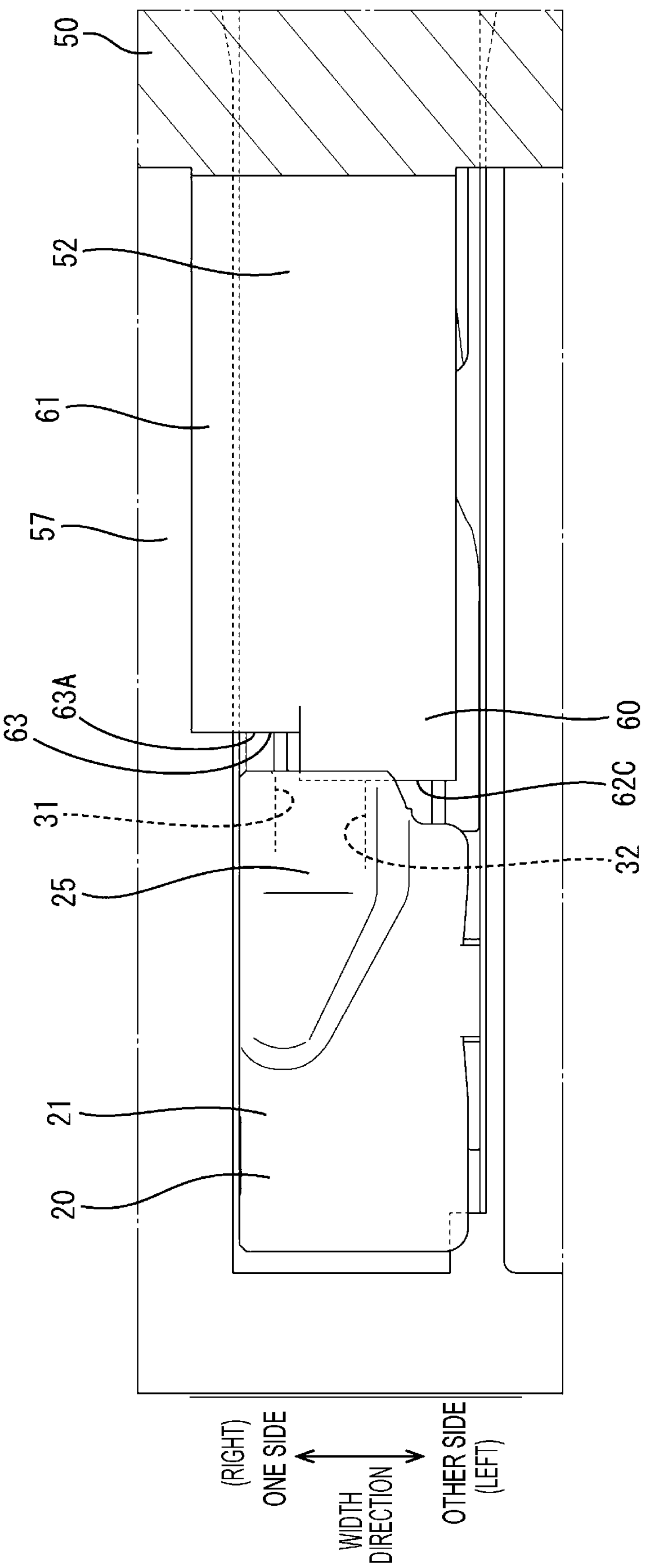
FIG. 12 is a bottom view in section showing a state where the terminal fitting is moved rearward from the state shown in FIG. 11 and the locking portion is in contact with the locking lance.

If the wire 80 connected to the terminal fitting 20 is pulled rearward with the terminal fitting 20 arranged in the cavity 51, a rearward force is applied to the terminal fitting 20. If the terminal fitting 20 is moved rearward, the locking portion 25 of the terminal fitting 20 contacts the locking lance 52 as shown in FIGS. 9 and 12. More specifically, the second rear surface portion 32A of the locking portion 25 contacts the corner portion 62C of the restricting portion 60. In this way, a rearward movement of the terminal fitting 20 is restricted.

Figure 10:
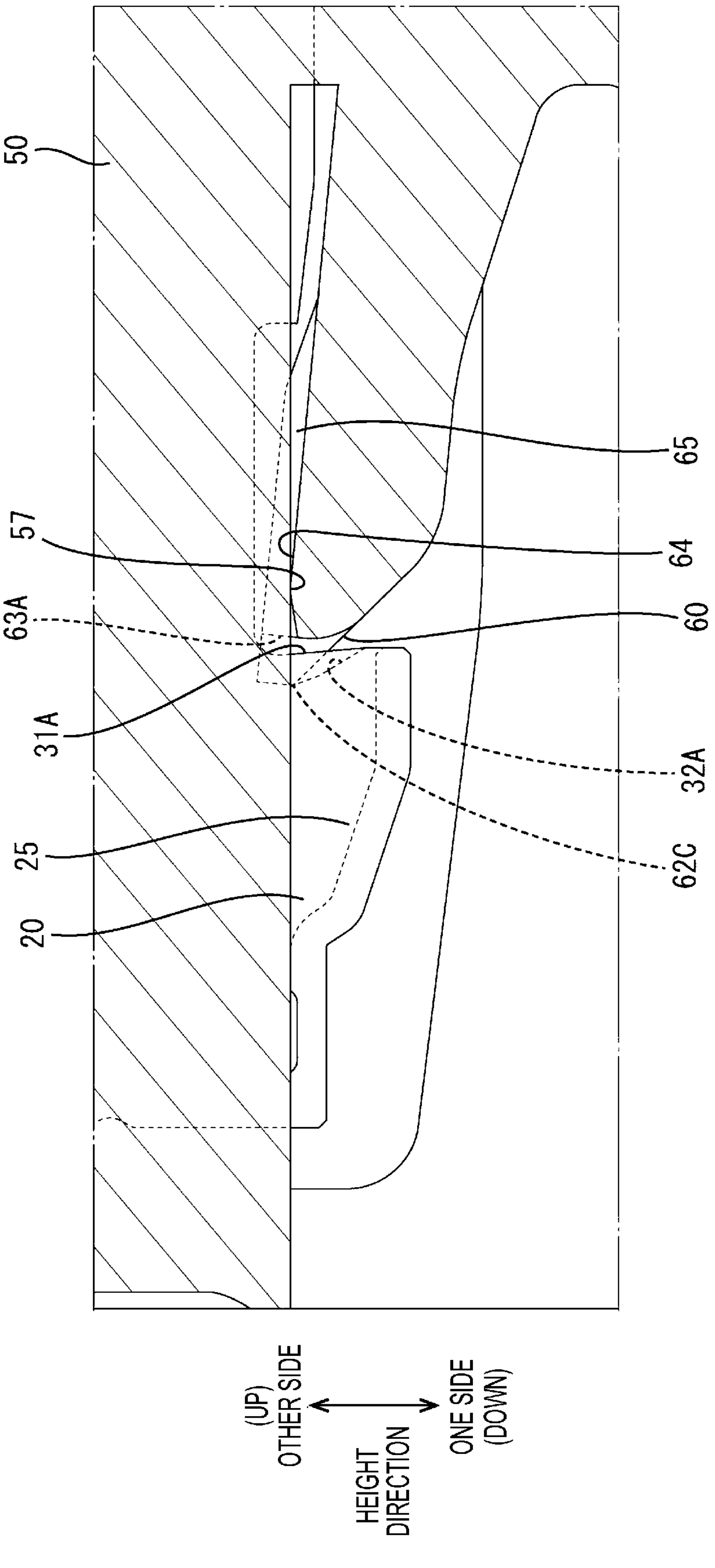
FIG. 10 is a side view in section showing a state where the terminal fitting is further moved rearward from the state shown in FIG. 9.

If the rearward force is further applied to the terminal fitting 20, the locking lance 52 is pushed from the locking portion 25 and deflected and deformed upward. If the first facing surface 64 of the locking lance 52 contacts the extended surface 57 as shown in FIG. 10, any further flexural deformation of the locking lance 52 is restricted. Moreover, the first facing surface 64 and the extended surface 57 restricting upward flexural deformation of the locking lance 52 are arranged outside the cavity 51 in the lateral direction (more specifically, to the right of the first side surface 54). Thus, it is not necessary to reduce a width of the locking lance 52, wherefore a reduction in the strength (locking force) of the locking lance 52 can be suppressed. Therefore, the connector 10 can suppress the flexural deformation of the locking lance 52 for restricting a rearward movement of the terminal fitting 20 while suppressing a reduction in the strength (locking force) of the locking lance 52.

Further, since the protruding portion 61 is provided only on the right side in the connector 10, the enlargement of the housing 50 in the lateral direction can be suppressed as compared to the case where the protruding portions 61 are provided on both sides.

Figure 13:
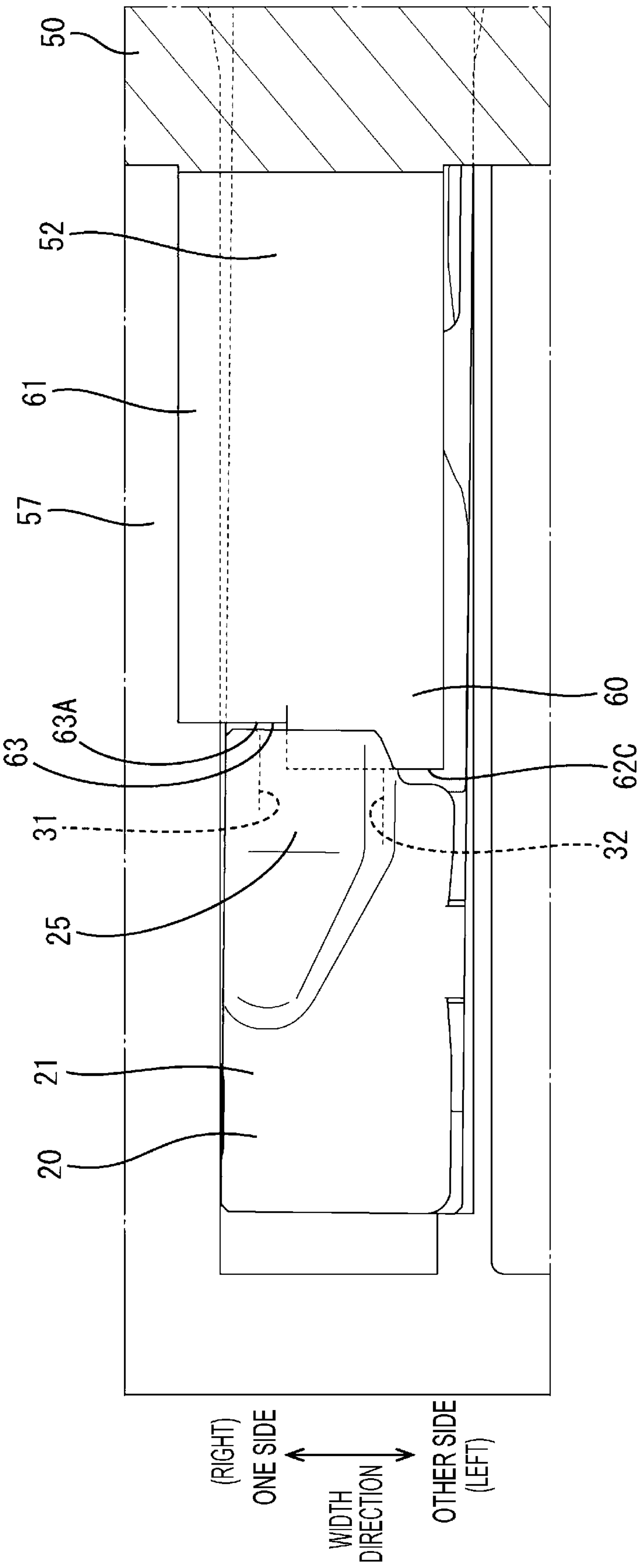
FIG. 13 is a bottom view in section showing a state where the terminal fitting is further moved rearward from the state shown in FIG. 12.

However, in the configuration in which the protruding portion 61 is arranged only on the right side, if the locking lance 52 is shifted leftward, a contact area of the first facing surface 64 and the extended surface 57 decreases and a force for restricting the flexural deformation of the locking lance 52 is reduced. In this regard, in the connector 10, if a rearward force is applied to the terminal fitting 20 and the locking lance 52 contacts the locking portion 25, the right end part of the locking portion 25 is fit into the recess 63 of the locking lance 52 as shown in FIG. 13, whereby a front end part of the terminal fitting 13 is swung rightward. If the rearward force is further applied to the terminal fitting 20 in this state, the locking lance 52 is pulled rightward. Therefore, the connector 10 can suppress a leftward shift of the locking lance 52 and suppress a reduction in force for restricting the flexural deformation of the locking lance 52.

However, in the configuration described above, there is a concern that a function of the locking lance 52 to restrict a rearward movement of the terminal fitting 20 is not stabilized by the locking lance being deflected and deformed rightward. In this regard, the locking lance 52 has the second facing surface 65 facing the first side surface 54 in the lateral direction with the first facing surface 64 held in contact with the extended surface 57. Thus, even if the locking lance 52 is deflected and deformed rightward with the first facing surface 64 of the locking lance 52 held in contact with the extended surface 57, any further flexural deformation is restricted by the contact of the second facing surface 65 with the first side surface 54. Therefore, the connector 10 can stabilize the position of the locking lance 52 in the lateral direction, with the result that a rearward movement of the terminal fitting 20 can be more stably restricted.

By this configuration, the force of the locking lance 52 to restrict a rearward movement of the terminal fitting 20 is enhanced and the protrusion of the locking lance 52 into the cavity 51 is suppressed. The mold removal hole 72 is defined by the lower end edge of the front wall 70 and the tab insertion holes 71 are closed on the entire circumference. Therefore, according to the connector 10, it is not necessary to separately provide a front member including tab insertion holes closed on the entire circumference and an increase in the number of components can be suppressed.

Other Embodiments of Present Disclosure

The embodiment disclosed this time should be considered illustrative in all aspects, rather than restrictive.

(1) Although the protruding portion is provided only on the right side of the restricting portion in the above embodiment, the protruding portions may be provided on both left and right sides.

(2) Although the partition walls are provided in the above embodiment, the partition walls may not be provided. That is, the mold removal holes for the locking lances may communicate with the tab insertion holes. In other words, the mold removal holes for the locking lances may be configured as mold removal holes for both the locking lances and the tab insertion holes.

(3) Although the locking lance includes the recess in the above embodiment, the locking lance may not include the recess.

(4) Although the locking lance has the second facing surface facing the first side surface in the lateral direction in the above embodiment, the locking lance may not have the second facing surface. For example, no step may be present between the protruding portion and the restricting portion.

(5) Although the second facing surface intersects the first facing surface in the above embodiment, these two surfaces may not intersect. For example, a step may be provided between the second and first facing surfaces.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

a terminal fitting; and a housing, the housing including:

a cavity extending in a front-rear direction;

a locking lance formed on one side in a height direction of the cavity, the locking lance being flexurally deformable in the height direction, and an extended surface formed outside the cavity in a width direction, the extended surface facing the one side in the height direction, the terminal fitting including a terminal body to be arranged in the cavity, the terminal body including a locking portion on the one side in the height direction, the locking lance including:

a restricting portion projecting into the cavity from the one side in the height direction, the restricting portion being lockable to the locking portion from behind; and a protruding portion protruding in the width direction from the restricting portion to a side where the extended surface is located, and the protruding portion having a facing surface facing the extended surface from the one side in the height direction, wherein the restricting portion includes a restricting surface facing forward and a recess recessed rearward from the restricting surface on one side in the width direction, and the locking portion is fittable into the recess on the one side in the width direction while being in contact with the restricting surface.

2. The connector of claim 1, wherein:

the housing includes a front wall arranged on a front end of the housing and a mold removal hole for the locking lance defined by an end edge on the one side in the height direction of the front wall, the locking lance is visually confirmable from front through the mold removal hole, and the front wall includes a tab insertion hole closed on an entire circumference at a position communicating with the cavity.

3. The connector of claim 1, wherein:

the extended surface is formed only on one outer side in the width direction of the cavity, and the protruding portion protrudes from the restricting portion only toward the one side in the width direction where the extended surface is located.

4. The connector of claim 3, wherein:

the locking lance has a second facing surface intersecting the facing surface and facing the one side in the width direction, and the second facing surface is arranged to face an inner surface on the one side in the width direction of the cavity with the facing surface held in contact with the extended surface.

5. The connector of claim 3, wherein:

the recess is recessed rearward from the restricting surface only on the one side in the width direction where the extended surface is located.

* * * * *